(12) United States Patent
Zacche

(10) Patent No.: US 8,851,881 B2
(45) Date of Patent: Oct. 7, 2014

(54) OVENS FOR PREFORMS

(71) Applicant: SMI S.p.A., Bergamo (IT)

(72) Inventor: Vanni Zacche, Bergamo (IT)

(73) Assignee: SMI S.p.A., Bergamo (IT)

( * ) Notice: Subject to any disclaimer, the term of this patent is extended or adjusted under 35 U.S.C. 154(b) by 106 days.

(21) Appl. No.: 13/629,684

(22) Filed: Sep. 28, 2012

(65) Prior Publication Data

US 2013/0084354 A1    Apr. 4, 2013

(30) Foreign Application Priority Data

Sep. 30, 2011   (IT) .............................. MI2011A1762

(51) Int. Cl.
| | | |
|---|---|---|
| *B29C 49/64* | (2006.01) | |
| *B29C 49/42* | (2006.01) | |
| *B29C 31/08* | (2006.01) | |
| *B65G 47/86* | (2006.01) | |
| *B29C 49/36* | (2006.01) | |
| *B29C 49/68* | (2006.01) | |

(52) U.S. Cl.
CPC ......... *B29C 49/4215* (2013.01); *B29C 49/4205* (2013.01); *B29C 49/36* (2013.01); *B65G 47/847* (2013.01); *B29C 49/68* (2013.01); *B29C 49/4236* (2013.01); *B29C 49/64* (2013.01)
USPC ..................... 425/526; 198/459.1; 198/459.4; 198/468.3; 198/470.1; 198/474.1; 414/158; 425/534

(58) Field of Classification Search
CPC ..... B29C 49/4125; B29C 49/68; B65G 47/30
USPC ......... 425/526, 534; 198/459.1, 459.4, 468.3, 198/470.1, 474.1; 414/158
See application file for complete search history.

(56) References Cited

U.S. PATENT DOCUMENTS

| | | | | |
|---|---|---|---|---|
| 4,265,357 | A * | 5/1981 | Amberg et al. ............. | 198/459.4 |
| 5,683,729 | A * | 11/1997 | Valles ............................. | 425/526 |
| 5,783,232 | A * | 7/1998 | Roos et al. ..................... | 425/526 |
| 5,863,571 | A * | 1/1999 | Santais et al. ................. | 425/526 |
| 5,878,865 | A * | 3/1999 | Bailey et al. ............... | 198/459.8 |
| 6,148,721 | A * | 11/2000 | Hellmeier et al. .......... | 198/471.1 |
| 6,976,836 | B2 * | 12/2005 | Suzuki .......................... | 425/526 |
| 7,674,424 | B2 * | 3/2010 | Baumgarte et al. ........... | 264/535 |
| 2011/0151047 | A1 | 6/2011 | Borgatti et al. | |
| 2011/0177193 | A1 * | 7/2011 | Linke et al. ................... | 425/526 |
| 2012/0228087 | A1 * | 9/2012 | van der Vliet et al. ...... | 198/470.1 |
| 2013/0330437 | A1 * | 12/2013 | Zacche et al. ................ | 425/526 |

FOREIGN PATENT DOCUMENTS

| | | | |
|---|---|---|---|
| WO | 2010013200 A2 | 2/2010 | |
| WO | 2010013206 A2 | 2/2010 | |
| WO | 2010013207 A2 | 2/2010 | |

* cited by examiner

*Primary Examiner* — Robert B Davis
(74) *Attorney, Agent, or Firm* — Robert E. Alderson, Jr.

(57) ABSTRACT

Ovens for preforms in plastic material, applicable in particular but not exclusively to blowing machines and stretch blowing machines, are provided.

15 Claims, 4 Drawing Sheets

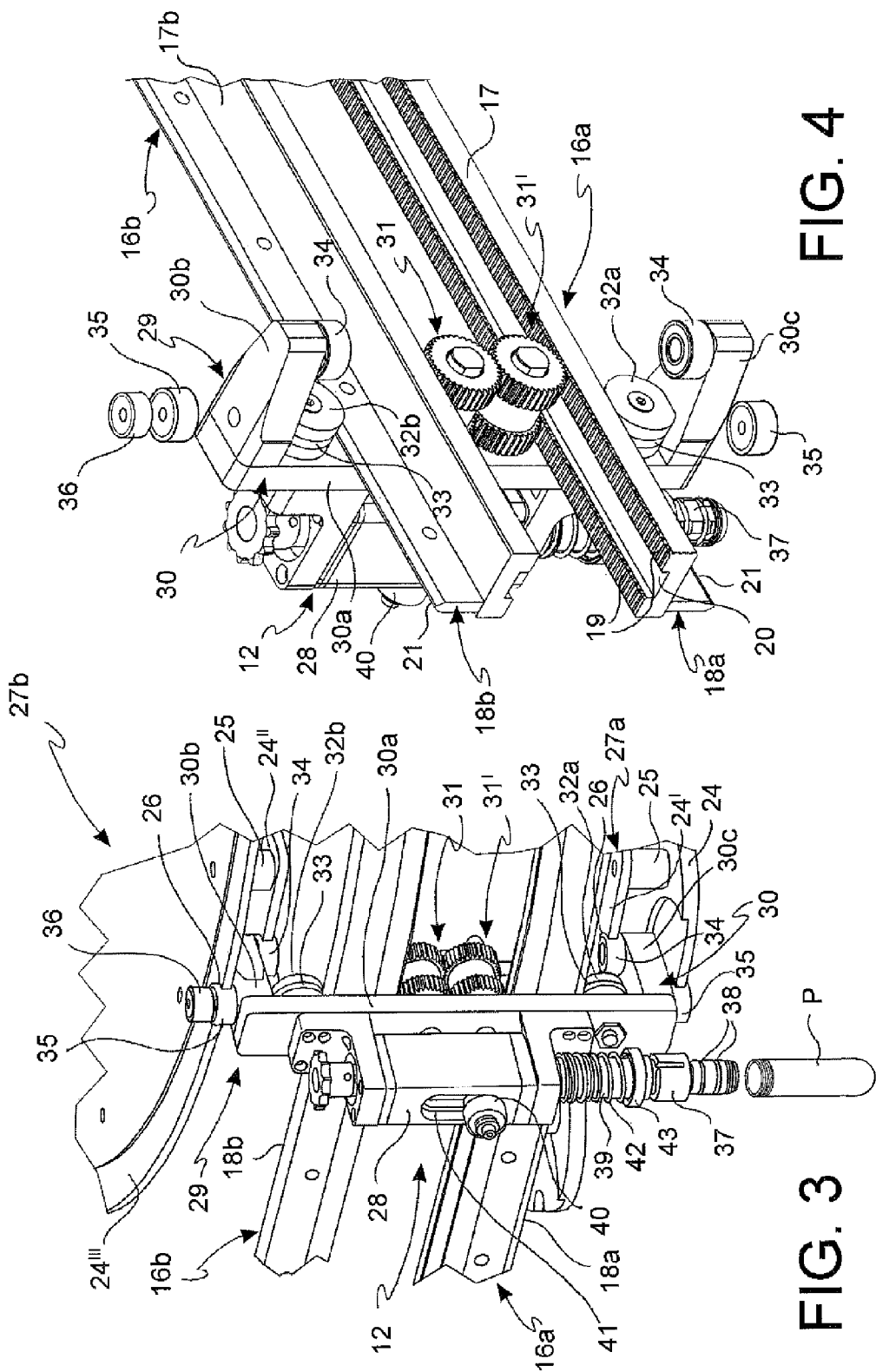

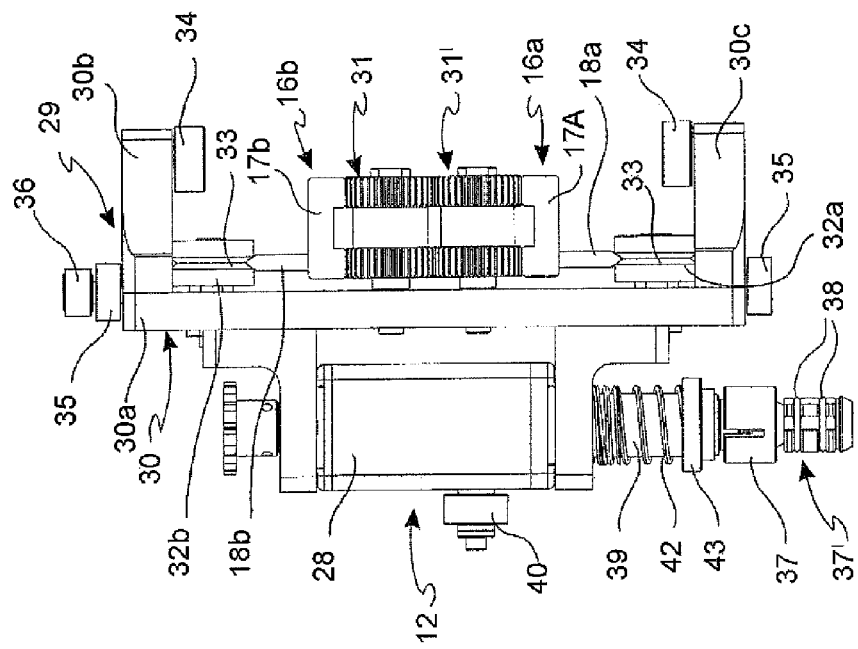
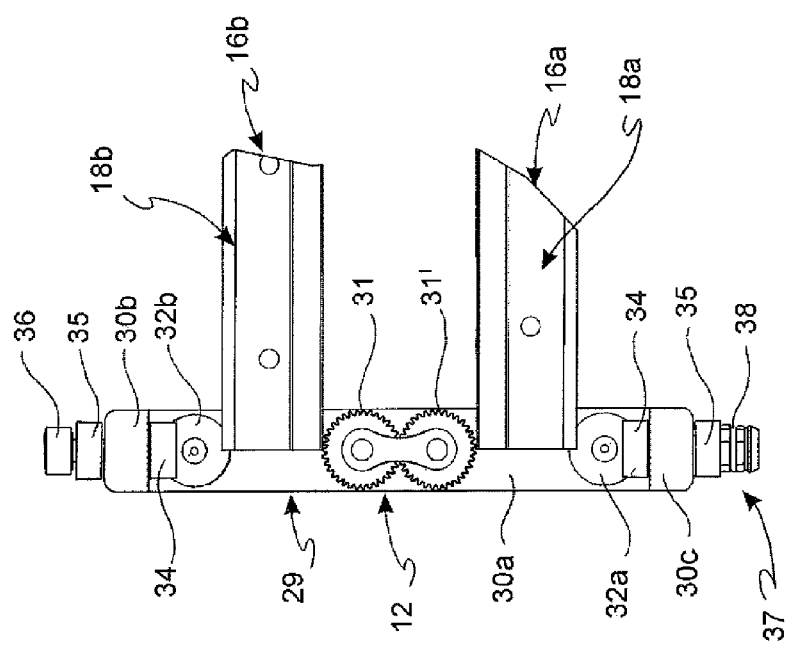

OVENS FOR PREFORMS

CROSS REFERENCE TO RELATED APPLICATION

This application claims priority to and benefit of Italian Patent Application No. MI2011A001762 filed Sep. 30, 2011, the contents of which are incorporated by reference in their entirety.

FIELD OF THE INVENTION

The present invention relates to ovens for preforms in plastic material, applicable in particular, but not exclusively, to blowing or stretch-blowing machines.

BACKGROUND OF THE INVENTION

Obtaining containers by blowing special preforms appropriately heated inside a mould of the desired shape is a method widely used in the packaging sector, in particular for making bottles for drinks.

Two basic methods exist which include on the one hand simple blowing and on the other, stretch-blowing, both of which provide for pneumatic blowing and mechanical stretching of the preforms in a mould. In both cases the preforms must reach the blowing or stretch-blowing machine in a thermal condition corresponding to the softening point of the material, so as to be plastically deformable inside the moulds.

Softening of preforms is performed in special ovens which include a series of heating modules positioned in series along a circuit of preforms.

To maximize both the heat efficiency of the oven and its dimensions, it is advisable for preforms to be inserted and slid inside the oven at as close a pitch as possible. (It is understood in this context that the term "pitch" refers to the spacing between one preform and an adjacent one.) This requirement is however contrary to the need for heated preforms to be sufficiently distanced for their insertion in the moulds of the blowing or stretch-blowing machine, the pitch of which, for obvious reasons of size, cannot be reduced beyond a certain limit.

In conventional machines, this distancing operation of the preforms to the pitch of the moulds is implemented by means of drive means, in particular distribution stars, which comprise a plurality of gripping means of preforms which are positioned at the same pitch as the moulds in the blowing machine or at an intermediate pitch between the latter and that of the preforms coming out of the oven. As a result, the distribution stars are placed in rotation at a higher speed than the supply speed of the heated preforms and lower or equal speed to the rotation speed of the blowing machine.

This change of speed imparts a considerable acceleration to the preforms. If one considers that preforms coming out of the oven are not rigid but softened, such acceleration may cause a deformation of the preforms, with a consequent formation of imperfections in the bottle obtained after blowing or stretch-blowing. In fact, deformed preform may contact the surface of the mould before the beginning of blowing, causing an abrupt cooling of the preform in the point of contact which is thus no longer able to undergo expansion.

SUMMARY OF THE INVENTION

The problem addressed by the present invention is to make available ovens and preforms which overcome the drawbacks described above.

Such problem is resolved by an oven for preforms as delineated in the appended claims which forms an integral part of this description.

Further characteristics and advantages of the present invention will be more clearly comprehensible from the description given below of some of its embodiments, made by way of a non-limiting example, with reference to the following drawings.

BRIEF DESCRIPTION OF THE FIGURES

FIG. 3 shows a detailed perspective view of a mandrel of the oven of FIG. 2.

FIG. 4 shows another detailed perspective view of the mandrel of FIG. 3 in a different operating position.

FIG. 5 is a side view in the direction A in FIG. 4.

FIG. 6 is a side view in the direction B in FIG. 4.

DETAILED DESCRIPTION

Figure 1:
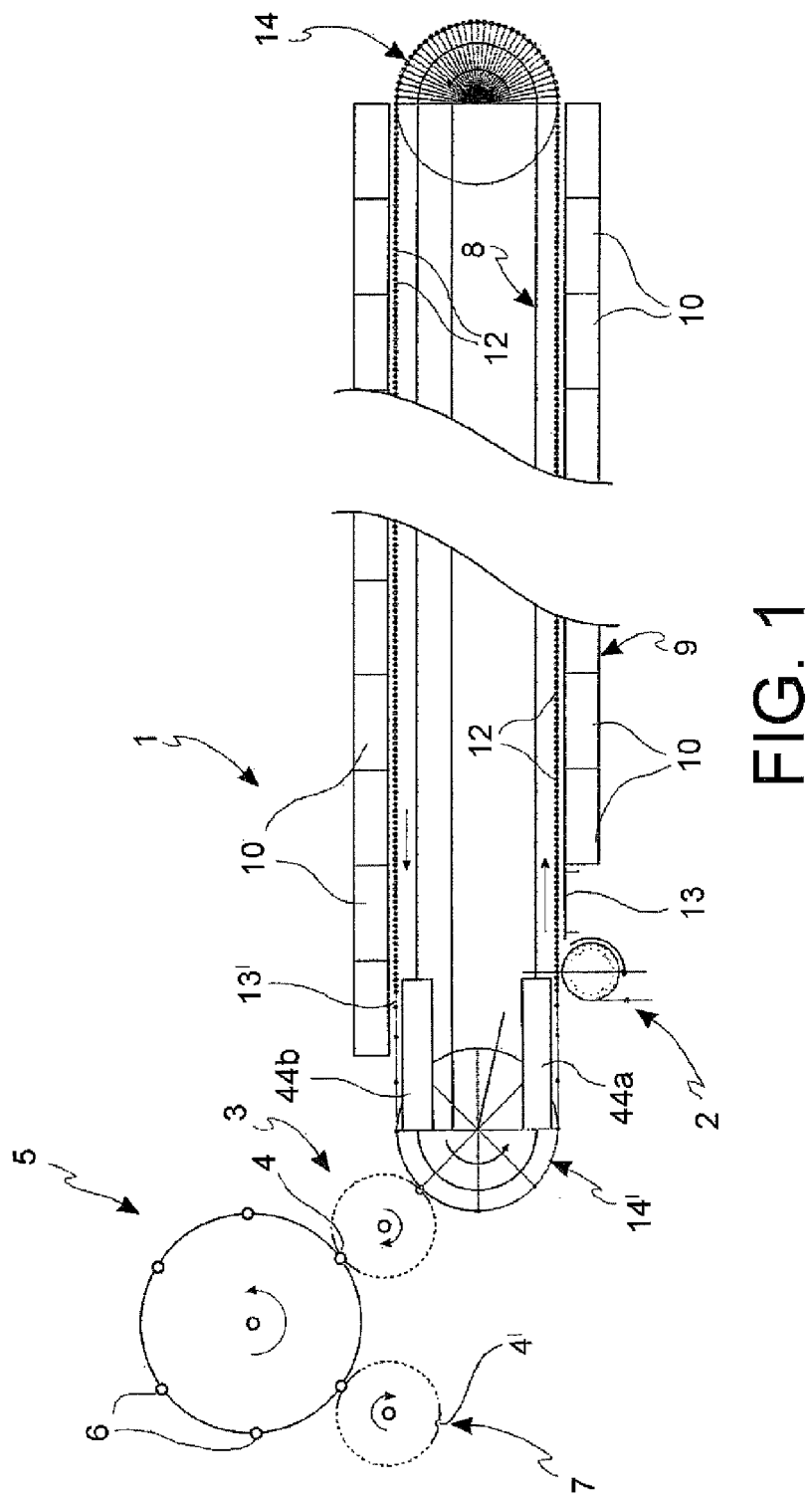
FIG. 1 shows a schematic plain view of an oven-blowing machine assembly according to embodiments of the invention.
Figure 2:
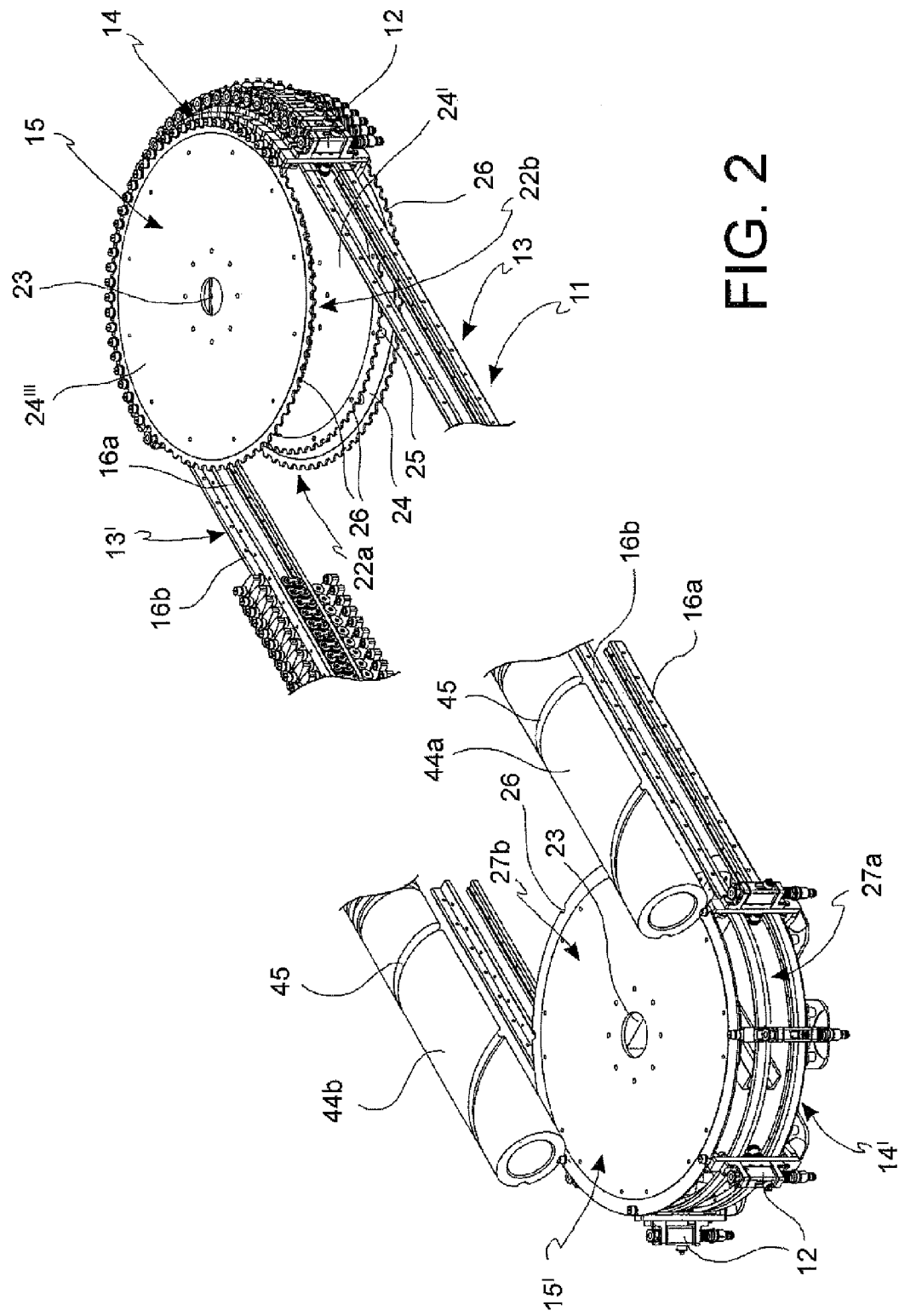
FIG. 2 shows a partial perspective view of an oven for preforms according to embodiments of the invention.

With reference to the figures, reference numeral 1 globally denotes ovens for preforms according to the invention, which may be operatively connected to drive units 2, 3 of the preforms, respectively entering and leaving the oven 1. Such drive units 2,3 may include, but are not limited to distribution stars which may include a series of gripping members 4, such as notches or indentations, adapted for engaging the preforms, for example at the neck.

The drive units 3 for preforms coming out of the oven 1 in turn may be operatively connected to a blowing machine 5 (the term "blowing machine" used in the present description refers to any type of blowing or stretch-blowing machine) which includes, for example, a plurality of moulds 6 in which heated preforms, are inserted and from which they come out in the form of a blown (or stretch-blown) bottle.

The blowing machine 5 in turn may be operatively connected to distribution unit 7, typically including a distribution star, suitable for picking up the blown bottles coming out of the blowing machine and transferring them, by a suitable transport mechanism, to a subsequent operating unit. The distribution star 7 may include for to such purpose a plurality of notches 4' suitable for engaging the neck of the blown bottles.

A path is thus defined for the preforms, shown in FIG. 1 by the direction of the arrows, from their being fed to the oven 1 to their entrance in the moulds 6 of the bowing machine 5.

The oven 1 may include a transport mechanism 8, adapted for moving the preforms along a path inside said oven, and heating units 9.

The heating units 9 may include of a plurality of heating modules 10 aligned along the preform path, typically outside the transport mechanism 8. Such heating modules 10 may include, for example, one or more infrared lamps and suitable reflective surfaces to optimise the output of the lamps.

The transport mechanism 8 may include a track 11 on which a plurality of mandrels 12 slide, each adapted for engaging a preform. The track 11 may include two rectilinear sections 13, 13' substantially parallel and two curved sections 14, 14' which connect the rectilinear sections 13, 13' at their ends according to a circular arc route. At the point of said curved sections 14, 14' respective conductor wheels 15, 15' may be placed, as will be described further below.

The track 11 may include a pair of rails 16a, 16b placed vertically, each in turn divided into rectilinear sections and curved sections at the rectilinear sections and curved sections 13, 13', 14, 14' of the track 11.

The rails 16a, 16b may include an L-shaped cross-section profile, comprising a rack bar 17a, 17b which forms one side of the L and a guide bar 18a, 18b which forms the other side of the L. In the track 11, the rack bars 17a, 17b of the rails 16a, 16b may be facing, while the relative guide bars 18a, 18b extend in opposite directions on the same vertical plane.

The rack bars 17a, 17b may include, on the rectilinear sections 13, 13' of the track 11, a double rack profile 19 separated by a furrow 20, while on the curved sections 14, 14' a single rack may be present. Such single rack may be made of an elastically deformable material, such as polyurethane.

The guide bar 18a, 18b may have a wedge-shaped profile 21 at the apex.

A first conductor wheel 15 may be placed in a distal position in relation to the feed point of the preforms into the oven 1, while the second conductor wheel 15' may be placed in correspondence with a release point of the heated preforms from the oven and in a proximal position to the feed point of the preforms into the oven 1.

The conductor wheels 15, 15' each may include two pairs of discs.

The first conductor wheel 15 may include a pair of lower discs 22a and a pair of upper discs 22b, respectively positioned below and above the rails 16a, 16b and inside the curved section 14 of the track 11. The two pairs of lower and upper discs 22a, 22b may be associated with the same vertical shaft 23 which is fitted idle to an adequate support (not shown) so that the shaft may rotate freely on the support on which it is hinged (i.e. it is not driven).

The pair of lower discs 22a may include a first and a second disc 24, 24', the second disc 24' being distanced above the first disc 24, by means of suitable spacers 25, and having a lesser diameter than that of the first disc 24.

Both the first and the second disc 24, 24' of the pair of lower discs 22a may include along their periphery a plurality of semi-circular indentations 26 positioned in sequence, in such a way that the indentations 26 of the first disc 24 may be radially aligned with the indentations 26 of the second disc 24'.

The pair of upper discs 22b may include a first and a second disc 24", 24''', the second disc 24''' being distanced above the first disc 24", by means of suitable spacers 25, and having a greater diameter than that of the first disc 24". In particular the second disc 24''' of the pair of upper discs 22b may have the same diameter as the first disc 24 of the pair of lower discs 22a, while the first disc 24" of the pair of upper discs 22b may have the same diameter as the second disc 24' of the pair of lower discs 22a.

Both the first and the second disc 24", 24''' of the pair of upper discs 22b may include along their periphery a plurality of semi-circular indentations 26 positioned in sequence, in such a way that the indentations 26 of the first disc 24" are radially aligned with the indentations 26 of the second disc 24''' and with the indentations 26 both of the first and the second disc 24, 24' of the pair of lower discs 22a.

The second conductor wheel 15' similarly may include a pair of lower discs 27a and a pair of upper discs 27b, respectively positioned below and above the rails 16a, 16b and inside the curved section 14' of the track 11. The second conductor wheel 15' may be the same as the first conductor wheel 15, except that the semicircular indentations 26 are positioned at an angular distance from one another which corresponds to the pitch of the notches 4 of the distribution star 3 for the heated preforms.

Each of the mandrels 12 may include a housing 28 integral with a sliding support 29.

The sliding support 29 may include a forked bar 30 with a C-shaped profile which may be placed astride the track 11. Said forked bar 30 may include a vertical plate 30a, from the two ends of which two arms 30b, 30c extend. Two cogged teeth 31, 31' may be joined to the vertical plate 30a so as to rotate, positioned along a vertical axis between the rack bars 17a, 17b of the rails 16a, 16b in such a way as to engage with each other and with the rack 19 of the respective bars. Each of the cogged teeth 31, 31' may include of two coaxial cogged pinions, positioned so as to engage with each other and with the double racks 19 present on the rectilinear sections of the rails. Vice versa, at the curved sections, only the outermost cogged pinion engages with the single rack in such embodiments (see FIG. 3).

In addition, two cylindrical bearings 32a, 32b may include fitted so as to rotate on the vertical plate 30a, near the arms 30b, 30c. Said bearings 32a, 32b may include a groove 33 positioned along the cylindrical surface, suitable for engaging in rotation with the respective guide bar 18a, 18b.

The arms 30b, 30c may include guides associated with the mandrel 12 adapted for engaging with the indentations 26 of the discs 24, 24', 24", 24''' of the conductor wheels 15, 15'.

Such guides may include a first pair of guide castors 34 fitted so as to rotate next to the distal end of the arms 30b, 30c and positioned in such a way as to face one another. This first pair of guide castors 34 may interfere with the indentations 26 of the second disc 24' of the pair of lower discs 22a, 27a and with the first disc 24" of the pair of upper discs 22b, 27b of the conductor wheels 15, 15'.

The guides may further include a second pair of guide castors 35 fitted so as to rotate on opposite sides of the arms 30b, 30c, next to the connection point between the arms 30b, 30c and the vertical plate 30a. The second pair of guide castors 35 may be destined to interfere with the indentations 26 of the first disc 24 of the pair of lower discs 22a, 27a and with the second disc 24''' of the pair of upper discs 22b, 27b of the conductor wheels 15, 15'.

Coaxially to the guide castor 35 positioned on the upper arm 30b, a thrust wheel 36 may be fitted so as to rotate. The function of said thrust wheel 36 will be evident from description below.

The housing 28 of the mandrel 12 may include a gripping finger 37 for a preform P (shown in FIG. 3). The gripping finger 37 may have a diameter slightly smaller than the inner diameter of the preform P and may include on the distal portion of its outer surface an engagement portion 37' comprising in turn one or more annular prominences 38 which favour the engagement with the inner neck of the preform. For example such prominences 38 may be made of elastic material such as an elastomer, or may be composed of elastic sectors which may radially retract or expand in relation to the cylindrical surface of the gripping finger 37, exerting a retention pressure on the inner surface of the preform.

The gripping finger 37 may further include a stem 39 which may be inserted in the housing 28 and may be vertically mobile. A driven body 40 may be joined to the stem 39 which may project externally from the housing 28 through a slit 41 positioned vertically on the housing body 28. Such driven body 40 may include a wheel adapted for interacting with a cam profile (not shown) which permits the raising or lowering of the gripping finger 37.

A spiral spring 42 may be positioned on the stem 39 and may push on a shoulder 43 next to the engagement portion 37' of the gripping finger 37. Such spring 42 may allow the elastic return downwards of the gripping finger 37.

The transport mechanism 8 of the oven 1 may further include drive and distancing units of the mandrels 12. Such drive units may include a first screw 44a positioned at the feed point of the preform into the oven, between the conductor wheel 15' and a first rectilinear section 13 of the track 11; and a second screw 44b positioned at a junction point between the second rectilinear section 13' of the track 11 and said conductor wheel 15'.

Both screws 44a, 44b may include a spiral groove 45 of variable pitch to interfere with the thrust wheel 36 of each mandrel 12. The screws 44a, 44b may be fitted in an inverted position in the drive direction of the mandrels 12, in such a way that the first screw 44a has its greatest pitch upstream in the drive direction, while the second screw 44b has its greatest pitch downstream.

The screws 44a, 44b may be moved independently but in synchrony by respective motors (not shown), or by a single motor equipped with mechanical transmission.

Ovens for preforms according to the invention may function as follows:

The preforms may be fed into the oven 1, for example, by means of the distributions star 2 shown in FIG. 1. At the feed point or in an upstream position, the mandrels 12 which may be pushed by the first screw 44a and may be in procession along the track 11 in contact with one another may interfere, by means of their driven body 40, with a suitable cam profile. This way, the gripping finger 37 may be raised from the cam and then lowered, thanks to the recall of the spring 42, so as to insert itself in the neck of the preform P and engage with it. From this point on each mandrel 12 may bear a preform which is kept in suspension.

The mandrels 12 with the preforms then may pass through the various heating modules 10 of the first rectilinear section 13 and, again, pushed by the first screw 44a, may be guided by the conductor wheel 15 passing to the second rectilinear section 13' of the track 11, where the preforms may be further heated by the other heating modules 10, until reaching the correct softening temperature of the material.

At this stage the mandrels 12 with the softened preforms, having reached the second screw 44b, may interfere with the respective groove 45 by means of the thrust wheel 36. Given that the groove 45 may have an increasing variable pitch, the mandrels 12, which come into contact with each other, are distanced at a greater pitch which corresponds to the pitch of the notches 4 of the distribution star 3. The preforms then may be picked up by the distribution star 3, but given that the pitch of the screw 44b may be the same as that of the star 3, the transfer may take place in constant velocity conditions, that is to say, the preforms may not undergo acceleration during such transfer.

The release of the preforms by the mandrels 12 may take place when the driven body 40 of the mandrels 12 interferes on a suitable cam profile, which may cause the raising of the gripping finger 37 in synchrony with the picking up of the preform by the distribution star 3.

The mandrels 12 deprived of the preforms and distanced at the greater pitch then may be guided by the conductor wheel 15' as far as the first screw 44a. The latter, which may have a groove 45 with decreasing pitch in the drive direction of the mandrels 12, may bring them back to the minimum pitch condition and may push them along the track 11 in contact with each other.

The advantages of this solution are multiple.

First, the system described herein makes it possible to maximise the efficiency of the oven in that the mandrels 12 may proceed in contact with each other, and thus at the minimum distance possible.

In addition, in certain embodiments, the mandrels 12 are not directly connected to the transport mechanism 8 but are pushed by the two screws 44a, 44b. This permits a significant simplification of the machine resulting in cost savings and reduced maintenance times.

The guide system which may include the cogged wheels 31, 31' which engage on the double rack bars 17a, 17b, as well as the guide castors 34, 35 which may engage with the indentations 26 of the conductor wheels 15, 15' permit an efficient control of the position of the mandrels 12, throughout their path, in relation to the oscillations around longitudinal or transversal axes of said mandrel.

The bearings 32a, 32b, which may slide on the respective guide bars 18a, 18b may help maintain the correct position of the mandrels 12.

In addition, the second screw 44b may hold the mandrels 12 at the same pitch as the distribution star 3 which picks up the heated preforms, determining a constant velocity transfer of the same. This results in an absence of acceleration on the preforms and thereby avoids their deformation which, as said previously, may have undesirable effects on the final result of the blowing operation.

A person skilled in the art may make modifications based on the present disclosure to adapt it to specific applications. It is intended that such applications are within the scope of protection of the present invention.

For example in one embodiment, the bearings 32a, 32b and the respective guide bars 18a, 18b may be eliminated, without thereby jeopardizing the stability of the mandrels 12.

The invention claimed is:

1. A system for blowing or stretch-blowing plastic material, comprising an oven for heating and curing the heat profile of preforms,
    a blowing or stretch-blowing machine, comprising a plurality of mould units and a plurality of drive units of the preforms entering and exiting said oven, wherein said oven comprises units of transport devices and heating sources for the preforms, wherein said transport devices comprise a track on which a plurality of mandrels individually slide, each adapted for engaging a preform, and wherein said drive units for the preforms coming out of the oven comprise a plurality of gripping members for the preforms distanced at a fixed pitch substantially equivalent to the pitch of the moulds, wherein said oven comprises drive and distancing units of the heated preforms from a minimum pitch to a pitch substantially corresponding to the pitch of the gripping members of the drive units for the preforms coming out of the oven, and wherein said drive and distancing units distance said mandrels from a contact condition to a distanced condition wherein the mandrels are not in contact with one another and wherein the mandrels are separated by a pitch substantially corresponding to the pitch of the gripping members of the drive units.

2. The system of claim 1, wherein the track comprises two substantially parallel rectilinear sections and two curved sections which connect the rectilinear sections at their ends according to a circular arc path, wherein at said arc path of said curved sections respective first and second conductor wheels of the mandrels are placed, wherein the first conductor wheel is placed in a distal position in relation to the feed point of the preforms into the oven, while the second conductor wheel is placed in correspondence with a release point of the heated preforms coming out of the oven and in a proximal position to the feed point of the preforms into the oven.

3. The system of claim 1, wherein the track comprises a pair of rails placed vertically, wherein the rails comprise a rack bar facing one another.

4. The system of claim 3, wherein the rails have an L-shaped cross-section profile, comprising said rack bar which forms one side of the L and a guide bar which forms the other side of the L, wherein the guide bars extend in opposite directions on the same vertical plane, said rack bars comprising, on the rectilinear sections of the track, a double rack profile while on the curved sections a single rack is present in an elastically deformable material.

5. The system of claim 2, wherein said first and second conductor wheels comprise a pair of lower discs and a pair of upper discs, said pairs of discs being respectively positioned below and above the rails and inside the curved section of the track, wherein the pair of lower discs comprises a first and a second disc, the second disc being distanced above the first disc and having a lesser diameter than that of the first disc, and wherein the pair of lower discs comprises a first and a second disc, the second disc being distanced above the first disc and having a greater diameter than that of the first disc, said discs comprising a plurality of semi-circular indentations for conducting the mandrels.

6. The system of claim 5, wherein the second disc of the pair of upper discs has substantially the same diameter as the first disc of the pair of lower discs, while the second disc of the pair of upper discs has substantially the same diameter as the second disc of the pair of lower discs.

7. The system of claim 5, wherein said semicircular indentations of said discs are radially aligned and wherein the indentations of the first conductor wheel are positioned in sequence, while the indentations of said second conductor wheel are positioned at an angular distance from one another which corresponds to the pitch of the gripping members of the drive units for the preforms coming out of the oven.

8. The system of claim 1, wherein each of the mandrels comprises a housing integral with a sliding support, the sliding support comprising a forked bar with a C-shaped profile which is placed astride the track and comprises two cogged teeth positioned along a vertical axis between the rack bars of the rails in such a way as to engage with each other and with the racks of the respective bars.

9. The system of claim 8, wherein each of the cogged teeth comprises two coaxial cogged pinions, positioned so as to engage with the double racks present on the rectilinear sections of the rails, while at the curved sections, only one cogged pinion engages with the single rack comprising elastically deformable material.

10. The system of claim 8, wherein the sliding support comprises guides for the mandrel, adapted for engaging with the indentations of the discs of the first and second conductor wheels, said guides comprising: a) a first pair of guide castors positioned so as to face one another which interfere with the indentations of the second disc of the pair of lower discs and with the indentations of the first disc of the pair of upper discs of the conductor wheels, and b) a second pair of guide castors which interfere with the indentations of the first disc of the pair of lower discs and with the indentations of the second disc of the pair of upper discs of the conductor wheels.

11. The system of claim 8, wherein coaxially to the upper guide castor of the second pair of guide castors a thrust wheel is fitted so as to rotate so that it interacts with said drive, and distancing units.

12. The system of claim 1, wherein said drive and distancing units of the preforms comprise a first screw positioned at the feed point of the preforms into the oven, between the second conductor wheel and a first rectilinear section of the track, and a second screw positioned at a junction point between the second rectilinear section of the track and said conductor wheel.

13. The system of claim 12, wherein both screws comprise a spiral groove of variable pitch which interfere with the thrust wheel of each mandrel, said screws being fitted in an inverted position in the drive direction of the mandrels, in such a way that the first screw has its greatest pitch upstream in the drive direction, while the second screw has its greatest pitch downstream.

14. The system of claim 4, wherein said elastically deformable material comprises polyurethane.

15. A system for blowing or stretch-blowing plastic material, comprising an oven for heating and curing the heat profile of preforms, a blowing or stretch-blowing machine, comprising a plurality of mould and drive units of the preforms entering and exiting said oven, wherein said oven comprises units of transport devices and heating sources for the preforms, wherein said transport devices comprise a track on which a plurality of mandrels individually slide, each adapted for engaging a preform, and wherein said drive units for the preforms coming out of the oven, comprise a plurality of gripping members for the preforms distanced at a fixed pitch substantially equivalent to the pitch of the moulds, wherein said oven comprises drive and distancing units of the heated preforms from a minimum pitch to a pitch substantially corresponding to the pitch of the gripping members of the drive units for the preforms coming out of the oven, wherein said drive and distancing units of the preforms comprise a first screw positioned at the feed point of the preforms into the oven, between the second conductor wheel and a first rectilinear section of the track, and a second screw positioned at a junction point between the second rectilinear section of the track and said conductor wheel.

* * * * *